United States Patent
Wu et al.

(10) Patent No.: US 10,033,987 B2
(45) Date of Patent: Jul. 24, 2018

(54) DEVICE FOR GENERATING DEPTH INFORMATION, METHOD FOR GENERATING DEPTH INFORMATION, AND STEREO CAMERA

(71) Applicant: Etron Technology, Inc., Hsinchu (TW)

(72) Inventors: Ben Wu, Taipei (TW); Ming-Che Ho, Kaohsiung (TW); Pei-Chun Yeh, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 269 days.

(21) Appl. No.: 14/602,281

(22) Filed: Jan. 22, 2015

(65) Prior Publication Data

US 2015/0208057 A1 Jul. 23, 2015

(30) Foreign Application Priority Data

Jan. 23, 2014 (TW) .............................. 103102525 A (51) Int. Cl.
*H04N 13/00* (2018.01)
*H04N 13/02* (2006.01)

(52) U.S. Cl.
CPC ..... *H04N 13/0271* (2013.01); *H04N 13/0253* (2013.01)

(58) Field of Classification Search
None
See application file for complete search history.

(56) References Cited

U.S. PATENT DOCUMENTS

| 2009/0033753 A1* | 2/2009 | Sato | G01S 17/89 348/217.1 |
| 2013/0307966 A1* | 11/2013 | Komatsu | G06T 7/0069 348/135 |
| 2014/0028861 A1* | 1/2014 | Holz | H04N 5/23277 348/208.4 |

FOREIGN PATENT DOCUMENTS

TW 201227159 7/2012

* cited by examiner

*Primary Examiner* — Dakshesh D Parikh
(74) *Attorney, Agent, or Firm* — Winston Hsu (57) ABSTRACT

A device for generating depth information includes a plurality of light sources, an image capture unit, a control unit, and a processing unit. Each light source of the plurality of light sources emits a corresponding intensity light. The control unit controls the each light source of the plurality of light sources to emit the corresponding intensity light in turn, and controls the image capture unit to capture a plurality of images corresponding to the plurality of light sources. The processing unit generates a plurality of depth information corresponding to the plurality of light sources according to the plurality of images corresponding to the plurality of light sources and a background image after the image capture unit captures the plurality of images corresponding to the plurality of light sources and the background image.

6 Claims, 8 Drawing Sheets

DEVICE FOR GENERATING DEPTH INFORMATION, METHOD FOR GENERATING DEPTH INFORMATION, AND STEREO CAMERA

BACKGROUND OF THE INVENTION

1. Field of the Invention

The present invention relates to a device for generating depth information, a method for generating depth information, and a stereo camera, and particularly to a device, a method, and a stereo camera that can utilize each light source of a plurality of light sources to emit a corresponding intensity light to generate more accurate depth information.

2. Description of the Prior Art

In the prior art, a stereo camera utilizes a left eye image capture unit and a right eye image capture unit to simultaneously capture a series of left eye images and a series of corresponding right eye images, utilizes a searching comparison unit to compare each pixel of each left eye image of the left eye image and a corresponding pixel of a corresponding right eye image of the series of corresponding right eye images, utilizes a triangulation unit to generate a depth map corresponding to the each pixel of the each left eye image and the corresponding pixel of the corresponding right eye image according to a triangle law, the each pixel of the each left eye image, and the corresponding pixel of the corresponding right eye image, and utilizes a processing unit to generate a three-dimensional image according to the depth map corresponding to the each pixel of the each left eye image and the corresponding pixel of the corresponding right eye image.

However, the depth map generated by the prior is more segmented because of image distortion. Therefore, how to output a more complete depth map is an important issue for a stereo camera designer.

SUMMARY OF THE INVENTION

An embodiment provides a device for generating depth information. The device includes a plurality of light sources, an image capture unit, a control unit, and a processing unit. Each light source of the plurality of light sources emits a corresponding intensity light, and intensities of corresponding intensity lights emitted by the plurality of light sources are different from each other. The control unit is coupled to the plurality of light sources and the image capture unit for controlling the each light source of the plurality of light sources to emit the corresponding intensity light in turn, and controlling the image capture unit to capture a plurality of images corresponding to the plurality of light sources. The processing unit is coupled to the image capture unit for generating a plurality of depth information corresponding to the plurality of light sources according to the plurality of images corresponding to the plurality of light sources and a background image after the image capture unit captures the plurality of images corresponding to the plurality of light sources and the background image.

Another embodiment provides a method for generating depth information, wherein a device for generating depth information includes a plurality of light sources, an image capture unit, a control unit, and a processing unit. The method includes the control unit controlling each light source of the plurality of light sources to emit a corresponding intensity light in turn, wherein intensities of corresponding intensity lights emitted by the plurality of light sources are different from each other; the control unit controlling the image capture unit to capture a plurality of images corresponding to the plurality of light sources; and the processing unit generating a plurality of depth information corresponding to the plurality of light sources according to the plurality of images corresponding to the plurality of light sources and a background image after the image capture unit captures the plurality of images corresponding to the plurality of light sources and the background image.

Another embodiment provides a stereo camera. The stereo camera includes an image capture module, a depth information module, an image calibration unit, a corresponding unit, a processing unit, and a triangulation unit. The image capture module includes a first image capture unit and a second image capture unit. The first image capture unit is used for capturing a left eye background image at a first time; and the second image capture unit is used for capturing a right eye background image at the first time. The depth information module includes a plurality of light sources and a control unit. Each light source of the plurality of light sources is used for emitting a corresponding intensity light, and intensities of corresponding intensity lights emitted by the plurality of light sources are different from each other; the control unit is coupled to the plurality of light sources, the first image capture unit, and the second image capture unit for controlling the each light source of the plurality of light sources to emit the corresponding intensity light in turn, and further controlling the first image capture unit and the second image capture unit to capture a plurality of left eye images and a plurality of right eye images corresponding to the plurality of light sources, respectively, wherein the plurality of left eye images correspond to the plurality of right eye images. The image calibration unit is coupled to the image capture module for executing a camera calibration process on the first image capture unit and the second image capture unit according to camera calibration parameters, respectively. The corresponding unit is coupled to the image calibration unit for finding each corresponding object simultaneously shown in the left eye background image and the right eye background image and finding a plurality of predetermined areas corresponding to the plurality of light sources between the plurality of left eye images and the plurality of right eye images. The processing unit is coupled to the corresponding unit for generating a plurality of depth information corresponding to the plurality of light sources according to the plurality of predetermined areas corresponding to the plurality of light sources and the each corresponding object simultaneously shown in the left eye background image and the right eye background image after the corresponding unit finds the each corresponding object simultaneously shown in the left eye background image and the right eye background image and the plurality of predetermined areas corresponding to the plurality of light sources. The triangulation unit is used for generating a depth map corresponding to the each corresponding object simultaneously shown in the left eye background image and the right eye background image according to a triangle law, the plurality of depth information corresponding to the plurality of light sources, and the each corresponding object simultaneously shown in the left eye background image and the right eye background image.

The present invention provides a device for generating depth information, a method for generating depth information, and a stereo camera. The device and the method utilize a control unit to control each light source of a plurality of light sources to emit a corresponding intensity light at a time corresponding to the each light source of the plurality of light sources, utilize the control unit to control an image capture unit to capture an image corresponding to the each light source of the plurality of light sources, and utilize the processing unit to generate a plurality of depth informations corresponding to the plurality of light sources according to a plurality of images corresponding to the plurality of light sources and a background image after the image capture unit captures the plurality of images corresponding to the plurality of light sources and the background image. In addition, the stereo camera utilizes the method to assist a triangulation unit of the stereo camera to generate a depth map corresponding to each corresponding object simultaneously shown in a left eye image and a corresponding right eye image. Thus, because a depth map corresponding to each corresponding object simultaneously shown in a left eye image and a right eye image provided by the prior art is more segmented, the depth map corresponding to the each corresponding object simultaneously shown in the left eye image and the corresponding right eye image provided by the present invention is more accurate. Therefore, a three-dimensional image generated according to the depth map generated by the present invention is less distorted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
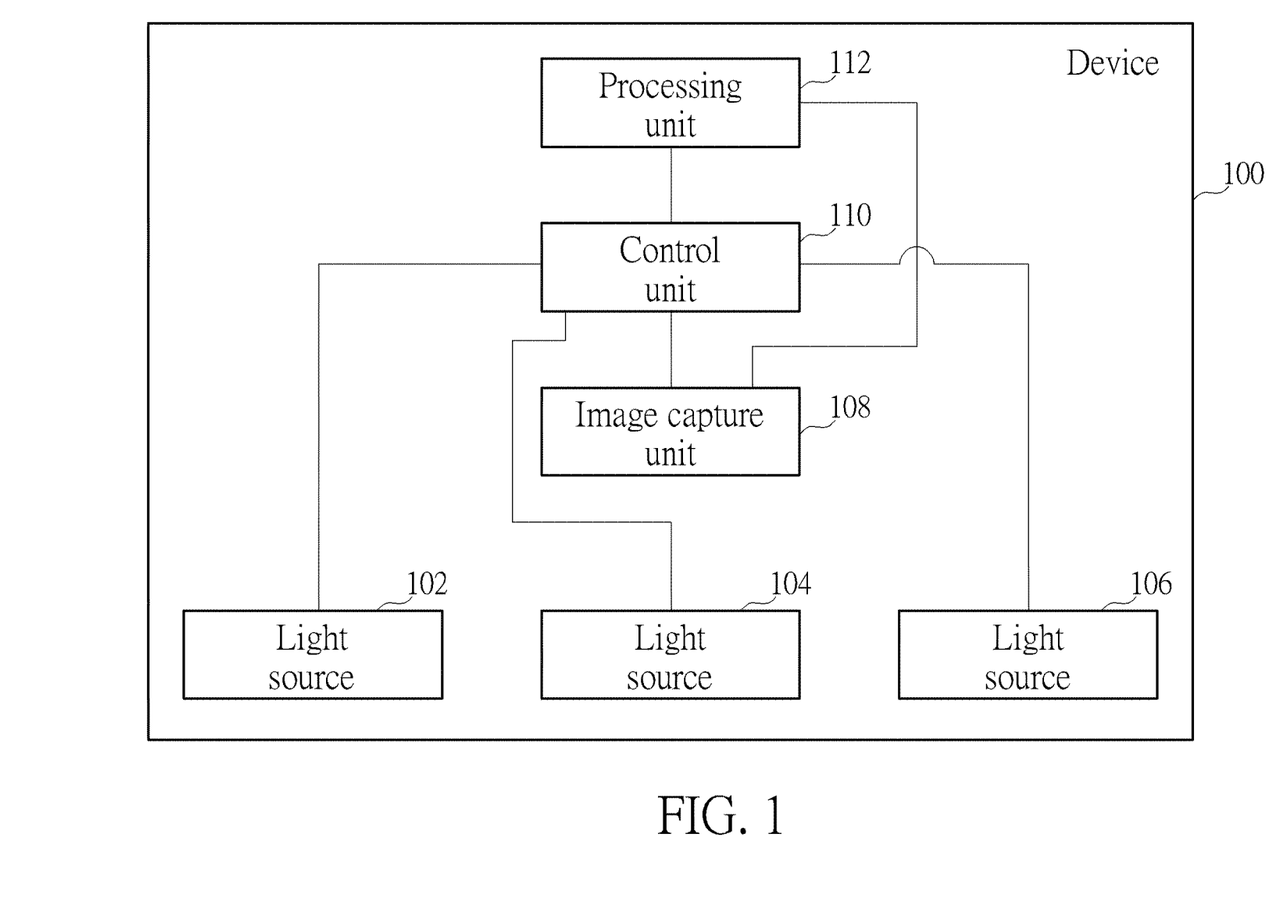
FIG. 1 is a diagram illustrating a device for generating depth information according to an embodiment.

Please refer to FIG. 1. FIG. 1 is a diagram illustrating a device 100 for generating depth information according to an embodiment. As shown in FIG. 1, the device 100 includes three light sources 102, 104, 106, an image capture unit 108, a control unit 110, and a processing unit 112, wherein the three light sources 102, 104, 106 are infrared light sources. But, the present invention is not limited to the device 100 including the three light sources 102, 104, 106. That is to say, the device 100 can include a plurality of light sources. In addition, the present invention is also not limited to the three light sources 102, 104, 106 being infrared light sources. That is to say, each light source of the three light sources 102, 104, 106 can be directivity visible light sources. For example, each light source of the three light sources 102, 104, 106 can be a light-emitting diode light source or a laser light source. In addition, the present invention is also not limited to the device 100 only including one image capture unit. That is to say, the device 100 can include a plurality of image capture units. Each light source of the three light sources 102, 104, 106 is used for emitting a corresponding intensity light. For example, the light source 102 can emit an infrared light with intensity I1, the light source 104 can emit an infrared light with intensity I2, and the light source 106 can emit an infrared light with intensity I3. The control unit 110 is coupled to the three light sources 102, 104, 106 and the image capture unit 108 for controlling a light source of the three light sources 102, 104, 106 to emit a corresponding intensity light at a corresponding time. For example, the control unit 110 is coupled to the three light sources 102, 104, 106 and the image capture unit 108 for controlling the light source 102 to emit the infrared light with intensity I1 at a time T1, the light source 104 to emit the infrared light with intensity I2 at a time T2, and the light source 106 to emit the infrared light with the intensity I3 at a time T3. When the control unit 110 controls the light source 102 to emit the infrared light with intensity I1 at the time T1, the light source 104 to emit the infrared light with intensity I2 at the time T2, and the light source 106 to emit the infrared light with the intensity I3 at the time T3, the control unit 110 can control the image capture unit 108 to capture an image F1 corresponding to the light source 102 at the time T1, an image F2 corresponding to the light source 104 at the time T2, and an image F3 corresponding to the light source 106 at the time T3. In addition, the control unit 110 can control the image capture unit 108 to capture a background image BI at a time T0. The processing unit 112 is coupled to the image capture unit 108 for generating 3 depth information corresponding to the three light sources 102, 104, 106 according to the three images F1, F2, F3 corresponding to the three light sources 102, 104, 106, respectively and the background image BI.

Figure 2:
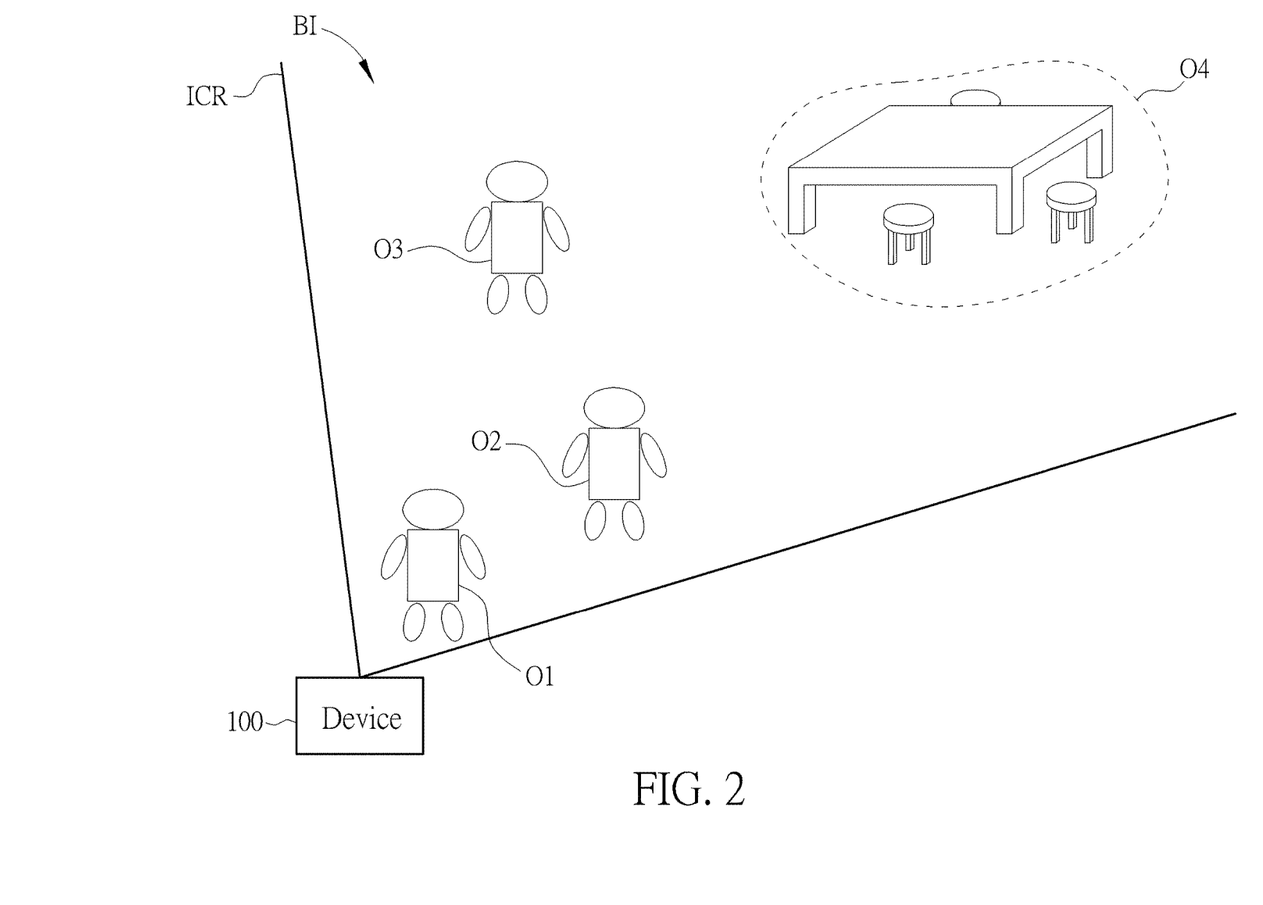
FIG. 2 is a diagram illustrating the background image.
Figure 3:
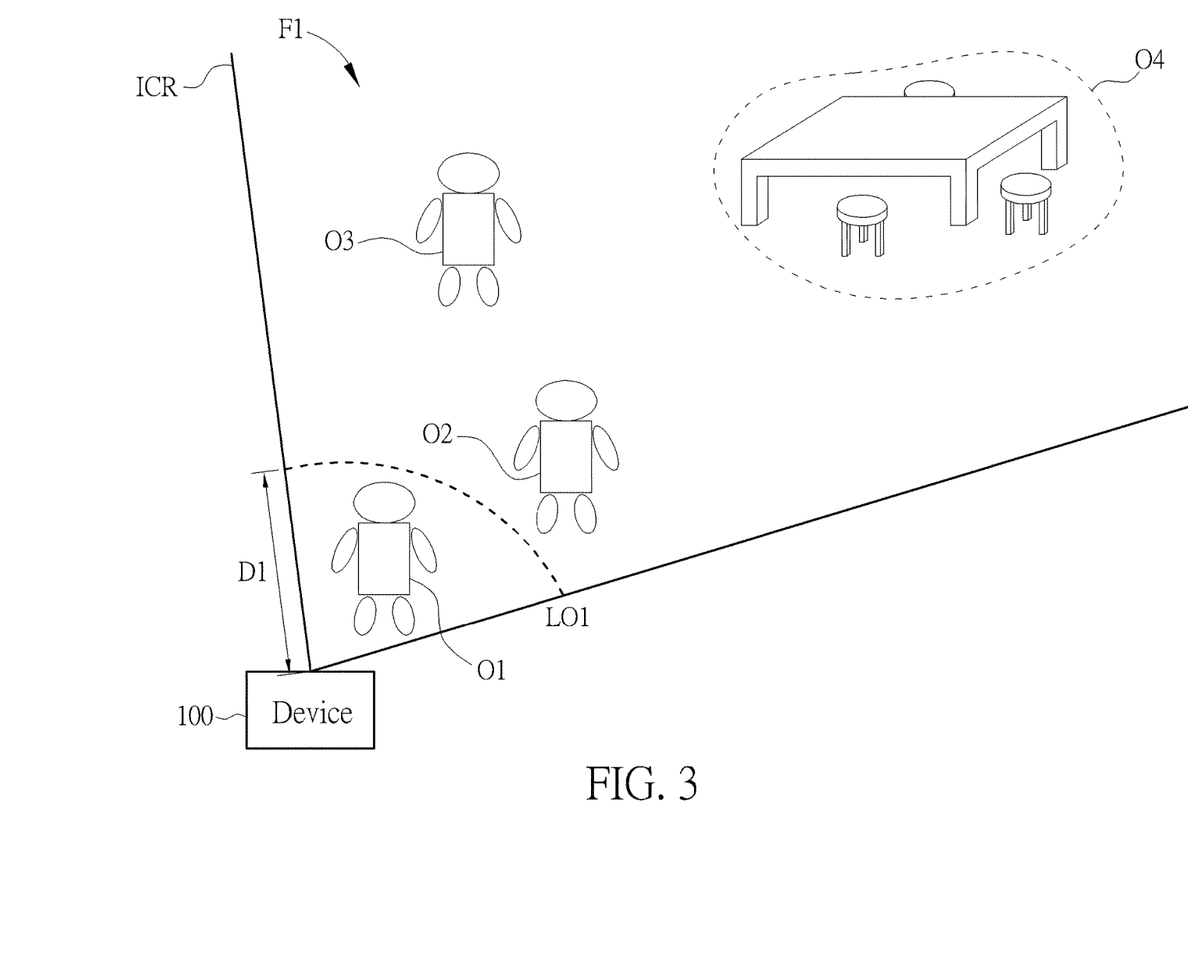
FIG. 3 is a diagram illustrating the image F1.
Figure 4:
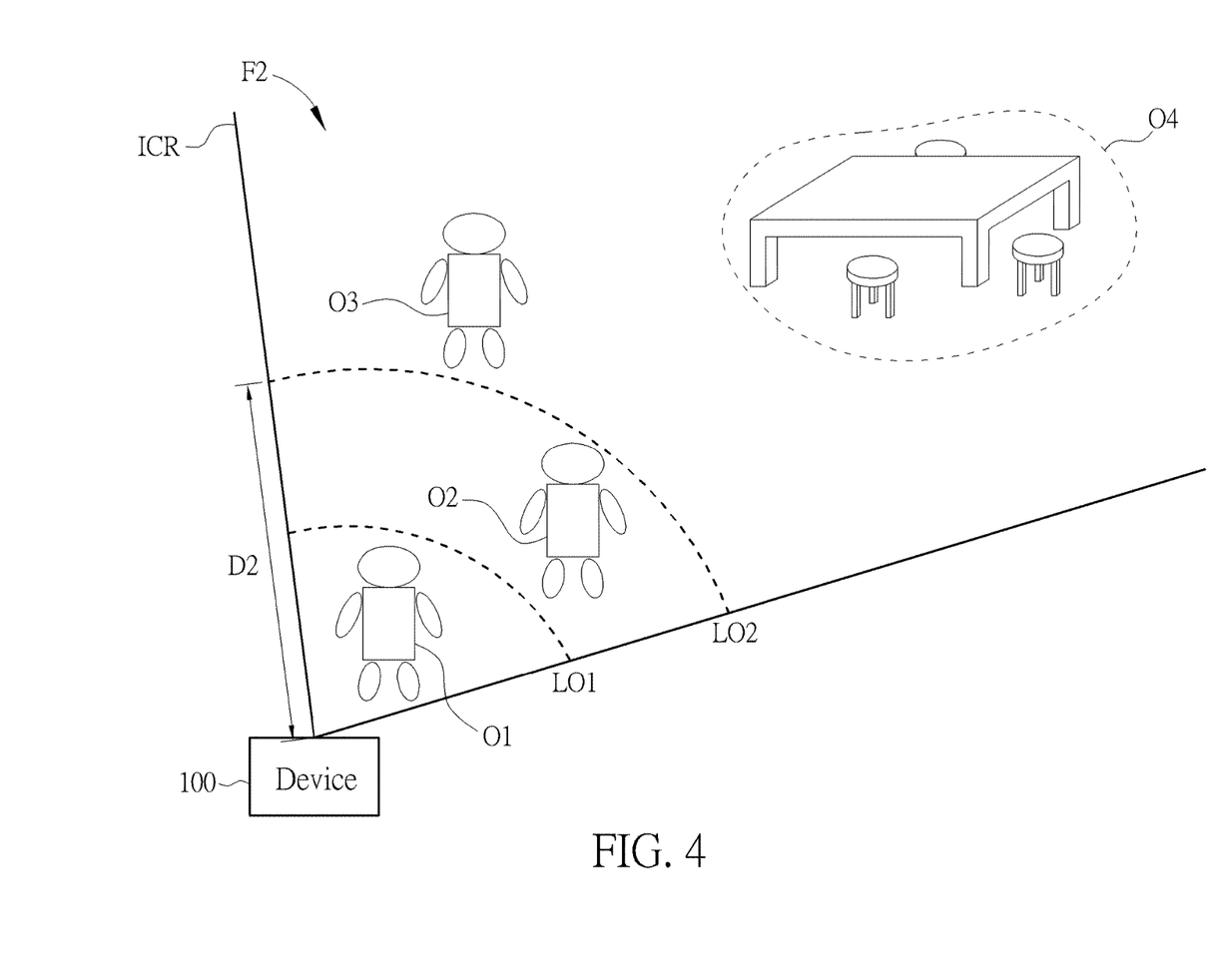
FIG. 4 is a diagram illustrating the image F2.
Figure 5:
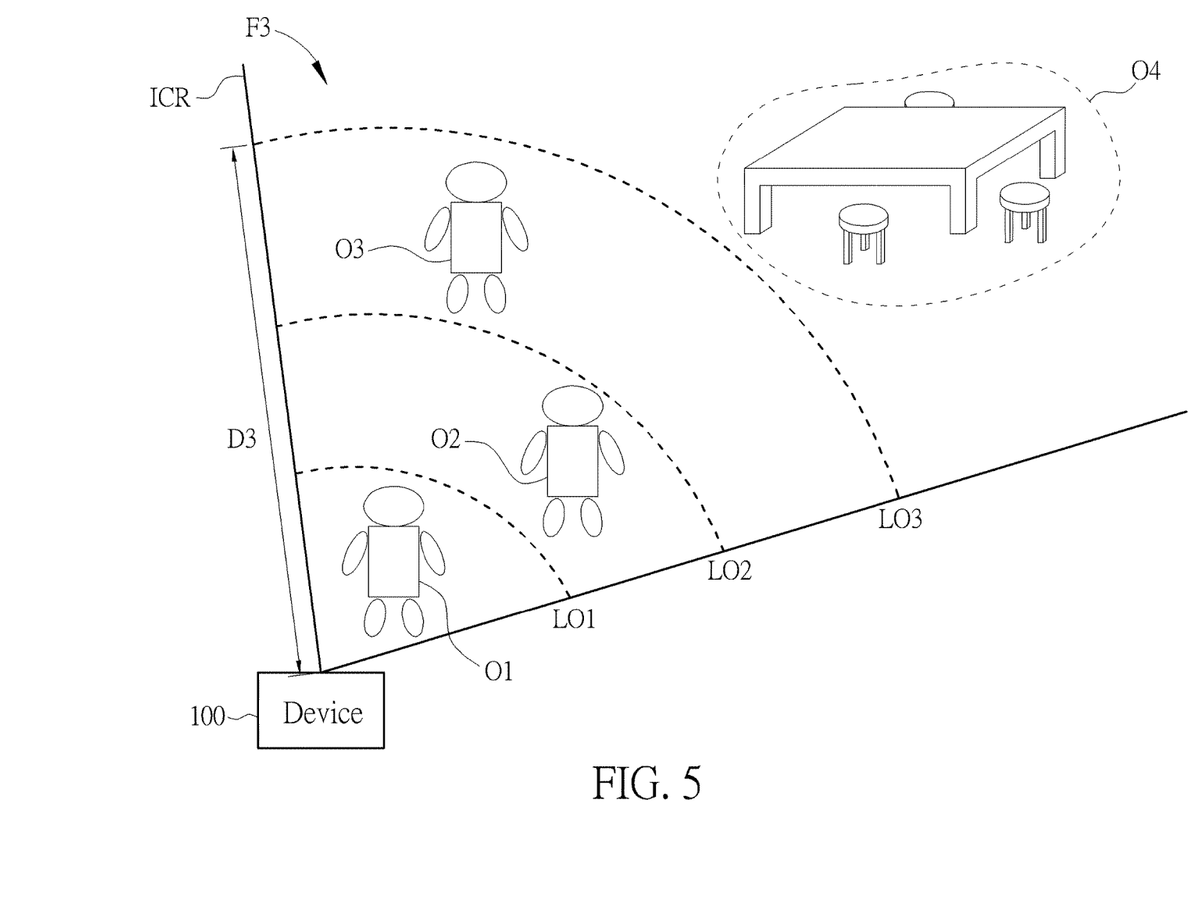
FIG. 5 is a diagram illustrating the image F3.

Please refer to FIG. 2, FIG. 3, FIG. 4, and FIG. 5. FIG. 2 is a diagram illustrating the background image BI, FIG. 3 is a diagram illustrating the image F1, FIG. 4 is a diagram illustrating the image F2, and FIG. 5 is a diagram illustrating the image F3. As shown in FIG. 2, when the three light sources 102, 104, 106 do not emit the corresponding infrared lights at the time T0, the image capture unit 108 can capture the background image BI corresponding to a background light within an image capture range ICR thereof. As shown in FIG. 3, when the control unit 110 controls the light source 102 to emit the infrared light with intensity I1 at the time T1, the image capture unit 108 can capture the image F1 corresponding to the light source 102 within the image capture range ICR thereof. Because the infrared light with intensity I1 can reach a position LO1 (wherein a distance D1 is between the position LO1 and the device 100), luminance of an object O1 within the image capture range ICR is greater than luminances of other objects (e.g. objects O2, O3, O4) within the image capture range ICR. As shown in FIG. 4, when the control unit 110 controls the light source 104 to emit the infrared light with intensity I2 at the time T2, the image capture unit 108 can capture the image F2 corresponding to the light source 104 within the image capture range ICR thereof. Because the infrared light with intensity I2 can reach a position LO2 (wherein a distance D2 is between the position LO2 and the device 100), luminances of the two objects O1, O2 within the image capture range ICR are greater than luminances of other objects (e.g. the objects O3, O4) within the image capture range ICR. As shown in FIG. 5, when the control unit 110 controls the light source 106 to emit the infrared light with the intensity I3 at the time T3, the image capture unit 108 can capture the image F3 corresponding to the light source 106 within the image capture range ICR thereof. Because the infrared light with the intensity I3 can reach a position LO3 (wherein a distance D3 is between the position LO3 and the device 100), luminances of the three objects O1, O2, O3 within the image capture range ICR are greater than luminances of other objects (e.g. the object O4) within the image capture range ICR.

Figure 6:
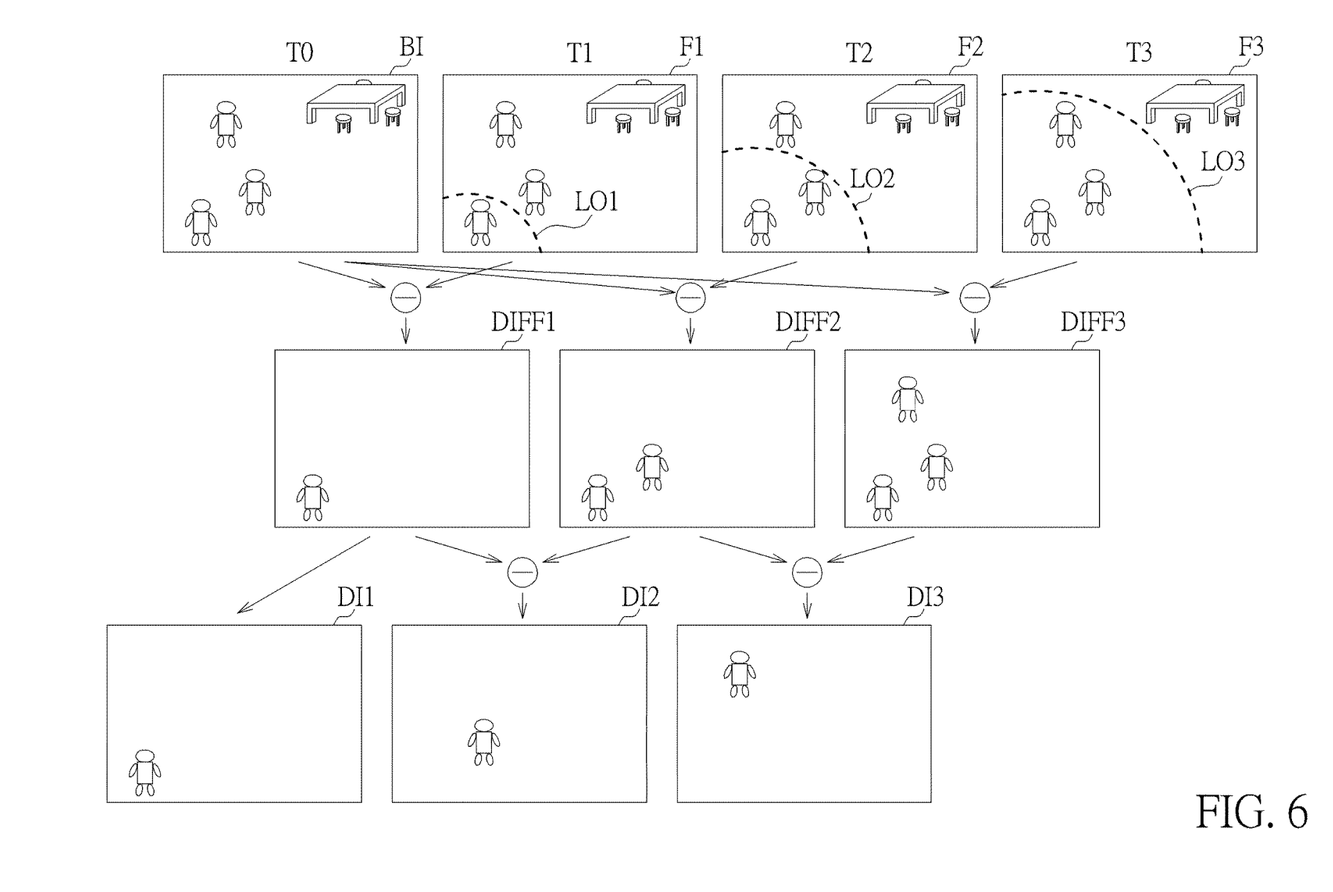
FIG. 6 is a diagram illustrating the processing unit generating three depth informations corresponding to the three light sources respectively according to the three images corresponding to the three light sources and the background image.

Please refer to FIG. 6. FIG. 6 is a diagram illustrating the processing unit 112 generating three depth informations DI1, DI2, DI3 corresponding to the three light sources 102, 104, 106 respectively according to the three images F1, F2, F3 corresponding to the three light sources 102, 104, 106 and the background image BI. As shown in FIG. 6, in the image F1, because the luminance of the object O1 within the image capture range ICR is greater than luminances of other objects (e.g. the objects O2, O3, O4) within the image capture range ICR, the processing unit 112 can generate a difference image DIFF1 according to the image F1 and the background image BI; in the image F2, because the luminances of the two objects O1, O2 within the image capture range ICR are greater than luminances of other objects (e.g. the objects O3, O4) within the image capture range ICR, the processing unit 112 can generate a difference image DIFF2 according to the image F2 and the background image BI; in the image F3, because the luminances of the three objects O1, O2, O3 within the image capture range ICR are greater than luminances of other objects (e.g. the object O4) within the image capture range ICR, the processing unit 112 can generate a difference image DIFF3 according to the image F3 and the background image BI. After the processing unit 112 generates the difference image DIFF1, the difference image DIFF2, and the difference image DIFF3, the processing unit 112 generates the depth information DI2 corresponding to the light source 104 according to the two adjacent difference images DIFF1, DIFF2, and generates the depth information DI3 corresponding to the light source 106 according to the two adjacent difference images DIFF2, DIFF3. In addition, because the difference image DIFF1 only corresponds to the light source 102, the difference image DIFF1 is the depth information DI1 in the present invention. As shown in FIG. 6, the depth information DI1 only shows the object O1 on the position L01. However, if other objects within the image capture range ICR also exist within the distance D1, the other objects existing within the distance D1 can be also shown in the depth information DI1. In addition, subsequent generation principles of the depth information DI2 and the depth information DI3 are the same as those of the depth information DI1, so further description thereof is omitted for simplicity. In addition, as shown in FIG. 6, the depth informations DI1, DI2, DI3 are rough depth informations for positioning corresponding distances (e.g. the distances D1, D2, D3).

In addition, the control unit 110 can repeatedly control the light sources 102, 104, 106 to emit the corresponding intensity lights in turn, so the image capture unit 108 can capture the image F1, the image F2, and the image F3 changed with time within the image capture range ICR thereof. Thus, the processing unit 112 can generate the three depth informations DI1, DI2, DI3 changed with time according to the image F1, the image F2, and the image F3 changed with time.

In addition, in another embodiment of the present invention, each light source of the three light sources 102, 104, 106 can emit lights with corresponding intensity and corresponding wavelength. For example, the light source 102 can emit an infrared light with intensity I1 and wavelength λ1, the light source 104 can emit an infrared light with intensity I2 and wavelength λ2, and the light source 106 can emit an infrared light with intensity I3 and wavelength λ3. In addition, subsequent generation principles of an embodiment of each light source of the three light sources 102, 104, 106 emitting a light with corresponding intensity and corresponding wavelength are the same as those of the above mentioned embodiment of each light source of the three light sources 102, 104, 106 emitting the corresponding intensity lights, so further description thereof is omitted for simplicity.

Because the device 100 can utilize the processing unit 112 to generate the depth information DI1, the depth information DI2, and the depth information DI3, the device 100 can be applied to a system (e.g. a camera, a video recorder, or a stereo camera (having at least two image capture units)) needing depth information within an image capture range ICR thereof. In addition, because the device 100 utilizes the three light sources 102, 104, 106 to emit the infrared lights with different intensities, the device 100 can be also applied to an environment with low luminance or monochromatic light.

Figure 7:
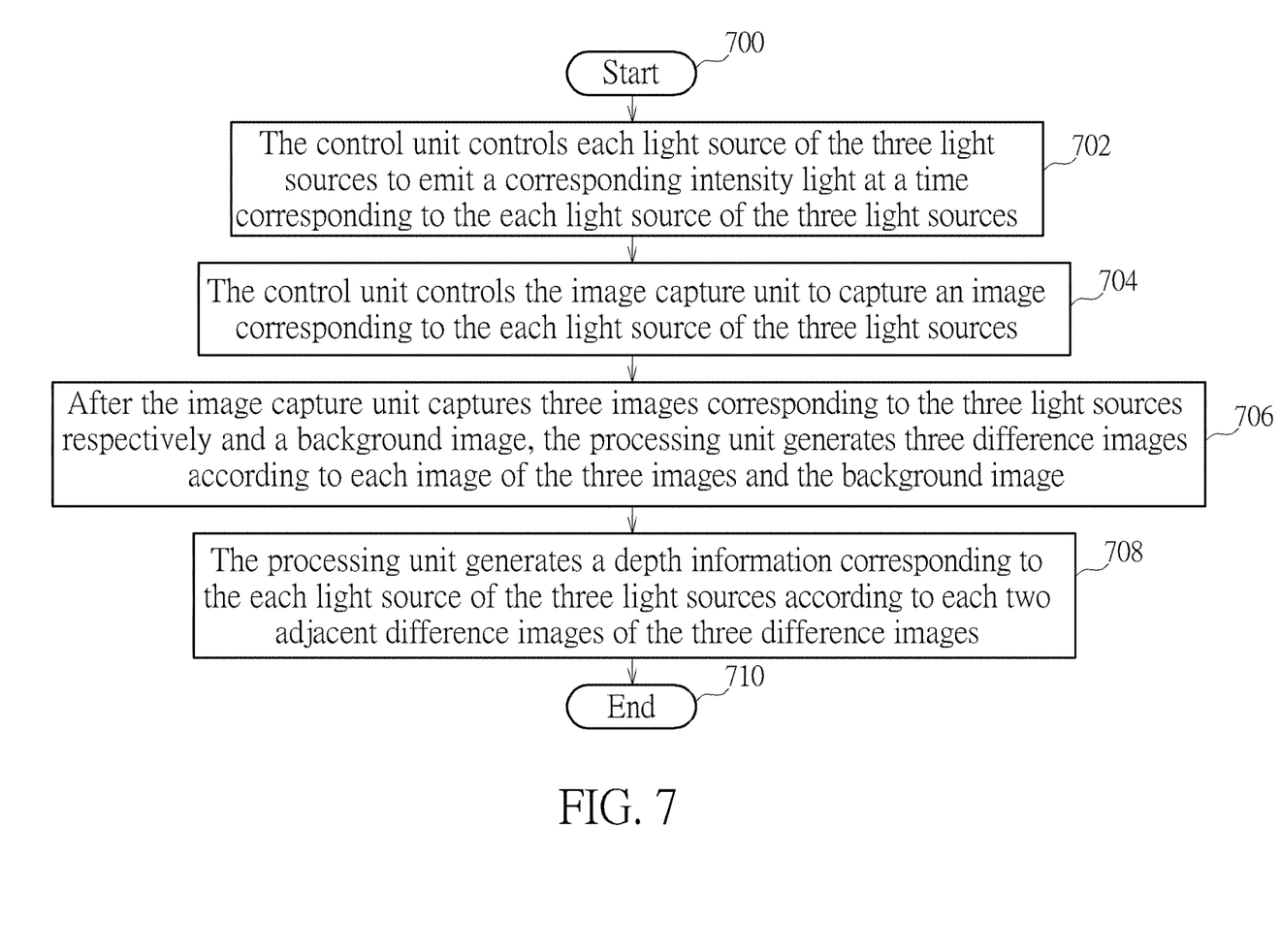
FIG. 7 is a flowchart illustrating a method for generating depth information according to another embodiment.

Please refer to FIG. 1 to FIG. 7. FIG. 7 is a flowchart illustrating a method for generating depth information according to another embodiment. The method in FIG. 7 is illustrated using the device 100 for generating depth information in FIG. 1. Detailed steps are as follows:

Step 700: Start.

Step 702: The control unit 110 controls each light source of the three light sources 102, 104, 106 to emit a corresponding intensity light at a time corresponding to the each light source of the three light sources 102, 104, 106.

Step 704: The control unit 110 controls the image to capture unit 108 capture an image corresponding to the each light source of the three light sources 102, 104, 106.

Step 706: After the image capture unit 108 captures three images F1, F2, F3 corresponding to the three light sources 102, 104, 106 respectively and a background image BI, the processing unit 112 generates three difference images DIFF1, DIFF2, DIFF3 according to each image of the three images F1, F2, F3 and the background image BI.

Step 708: The processing unit 112 generates a depth information corresponding to the each light source of the three light sources 102, 104, 106 according to each two adjacent difference images of the three difference images DIFF1, DIFF2, DIFF3.

Step 710: End.

In Step 702, the control unit 110 controls the light source 102 to emit the infrared light with intensity I1 at the time T1, the light source 104 to emit the infrared light with intensity I2 at the time T2, and the light source 106 to emit the infrared light with the intensity I3 at the time T3. In Step 704, as shown in FIG. 2, when the three light sources 102, 104, 106 do not emit the corresponding infrared lights at the time T0, the image capture unit 108 can capture the background image BI corresponding to the background light within the image capture range ICR thereof. As shown in FIG. 3, when the control unit 110 controls the light source 102 to emit the infrared light with intensity I1 at the time T1, the image capture unit 108 can capture the image F1 corresponding to the light source 102 within the image capture range ICR thereof. Because the infrared light with intensity I1 can reach the position LO1 (wherein the distance D1 is between the position LO1 and the device 100), the luminance of the object O1 within the image capture range ICR is greater than luminances of other objects (e.g. the objects O2, O3, O4) within the image capture range ICR. As shown in FIG. 4, when the control unit 110 controls the light source 104 to emit the infrared light with intensity I2 at the time T2, the image capture unit 108 can capture the image F2 corresponding to the light source 104 within the image capture range ICR thereof. Because the infrared light with intensity I2 can reach the position LO2 (wherein the distance D2 is between the position LO2 and the device 100), the luminances of the two objects O1, O2 within the image capture range ICR are greater than luminances of other objects (e.g. the objects O3, O4) within the image capture range ICR. As shown in FIG. 5, when the control unit 110 controls the light source 106 to emit the infrared light with the intensity I3 at the time T3, the image capture unit 108 can capture the image F3 corresponding to the light source 106 within the image capture range ICR thereof. Because the infrared light with the intensity I3 can reach the position LO3 (wherein the distance D3 is between the position LO3 and the device 100), the luminances of the three objects O1, O2, O3 within the image capture range ICR are greater than luminances of other objects (e.g. the object O4) within the image capture range ICR.

In Step 706, as shown in FIG. 3 and FIG. 6, in the image F1, because the luminance of the object O1 within the image capture range ICR is greater than luminances of other objects (e.g. the objects O2, O3, O4) within the image capture range ICR, the processing unit 112 can generate the difference image DIFF1 according to the image F1 and the background image BI; as shown in FIG. 4 and FIG. 6, in the image F2, because the luminances of the two objects O1, O2 within the image capture range ICR are greater than luminances of other objects (e.g. the objects O3, O4) within the image capture range ICR, the processing unit 112 can generate the difference image DIFF2 according to the image F2 and the background image BI; and as shown in FIG. 5 and FIG. 6, in the image F3, because the luminances of the three objects O1, O2, O3 within the image capture range ICR are greater than luminances of other objects (e.g. the object O4) within the image capture range ICR, the processing unit 112 can generate the difference image DIFF3 according to the image F3 and the background image BI. In Step 708, after the processing unit 112 generates the difference image DIFF1, the difference image DIFF2, and the difference image DIFF3, the processing unit 112 generates the depth information DI2 corresponding to the light source 104 according to the two adjacent difference images DIFF1, DIFF2 of the difference image DIFF1, the difference image DIFF2, and the difference image DIFF3, and generates the depth information DI3 corresponding to the light source 106 according to the two adjacent difference images DIFF2, DIFF3 of the difference image DIFF1, the difference image DIFF2, and the difference image DIFF3. In addition, because the difference image DIFF1 only corresponds to the light source 102, the difference image DIFF1 is the depth information DI1 in the present invention.

In addition, the control unit 110 can repeatedly execute Step 702 to Step 708 to control the light sources 102, 104, 106 to emit the corresponding intensity lights in turn, so the image capture unit 108 can capture the image F1, the image F2, and the image F3 changed with time within the image capture range ICR thereof. Thus, the processing unit 112 can generate the three depth informations DI1, DI2, DI3 changed with time according to the image F1, the image F2, and the image F3 changed with time.

In addition, in another embodiment of the present invention, each light source of the three light sources 102, 104, 106 can emit lights with corresponding intensity and corresponding wavelength. For example, the light source 102 can emit an infrared light with intensity I1 and wavelength λ1, the light source 104 can emit an infrared light with intensity I2 and wavelength λ2, and the light source 106 can emit an infrared light with intensity I3 and wavelength λ3. In addition, subsequent generation principles of an embodiment of each light source of the three light sources 102, 104, 106 emitting a light with corresponding intensity and corresponding wavelength are the same as those of the above mentioned embodiment of each light source of the three light sources 102, 104, 106 emitting the corresponding intensity light, so further description thereof is omitted for simplicity.

Figure 8:
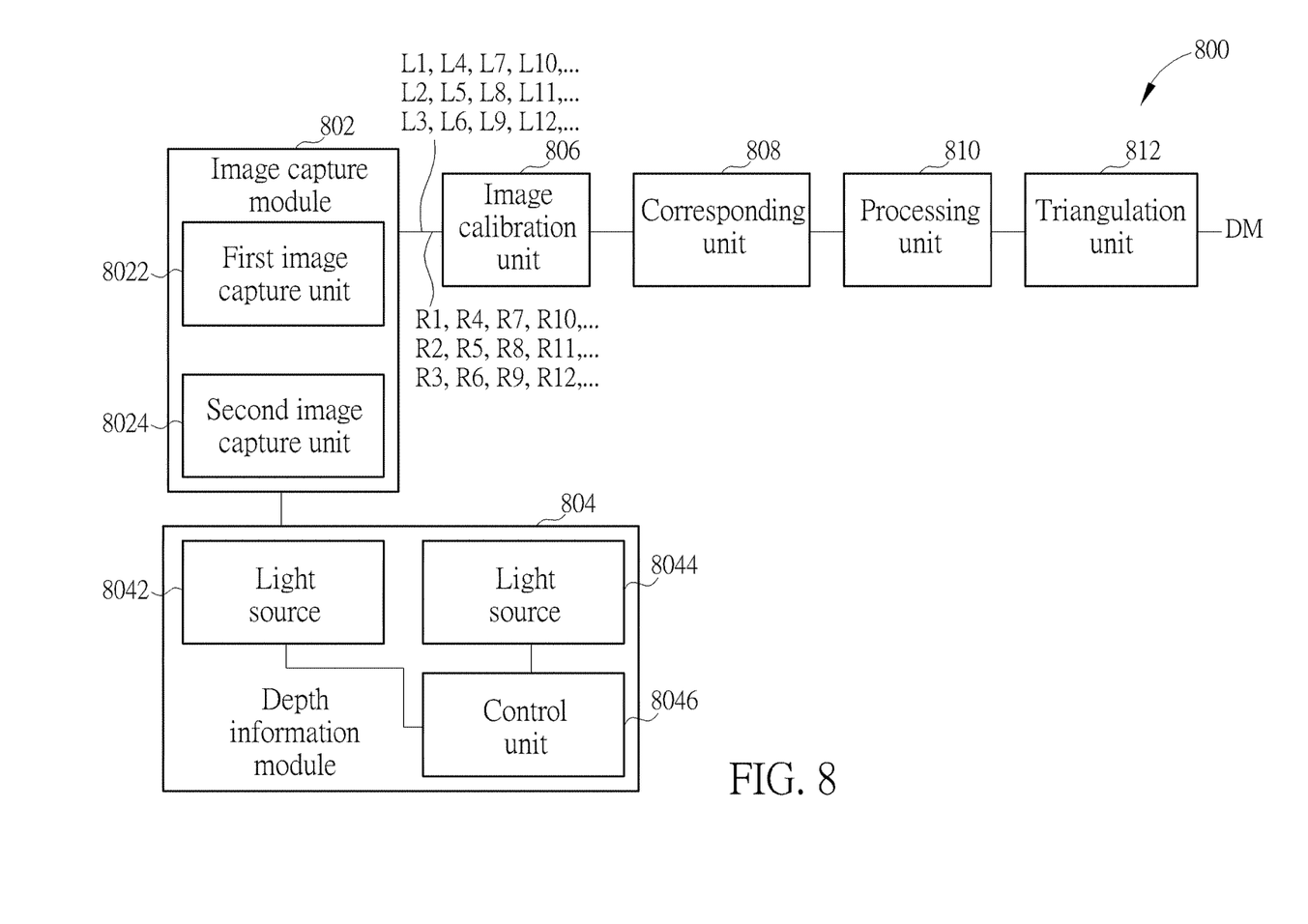
FIG. 8 is a diagram illustrating a stereo camera according to another embodiment.

Please refer to FIG. 8. FIG. 8 is a diagram illustrating a stereo camera 800 according to another embodiment. As shown in FIG. 8, the stereo camera 800 includes an image capture module 802, a depth information module 804, an image calibration unit 806, a corresponding unit 808, a processing unit 810, and a triangulation unit 812. The image capture module 802 includes a first image capture unit 8022 and a second image capture unit 8024. But, the present invention is not limited to the image capture module 802 including the first image capture unit 8022 and the second image capture unit 8024. That is to say, the image capture module 802 can include a plurality of image capture units. The first image capture unit 8022 is used for capturing a first series of left eye images (e.g. left eye images L1, L4, L7, L10, . . . ) at a first time sequence (e.g. times T1, T4, T7, T10, . . . ); and the second image capture unit 8024 is used for capturing a first series of right eye images (e.g. right eye images R1, R4, R7, R10, . . . ) at the first time sequence. The depth information module 804 includes two light sources 8042, 8044 and a control unit 8046. But, the present invention is not limited to the stereo camera 800 including the two light sources 8042, 8044. That is to say, the stereo camera 800 can include a plurality of light sources. Each light source of the two light sources 8042, 8044 is used for emitting a corresponding intensity light. For example, the light source 8042 can emit infrared light with intensity I1 and light source 8044 can emit infrared light with intensity I2. But, the present invention is not limited to the two light sources 8042, 8044 are infrared light sources and not limited to the two light sources 8042, 8044. The control unit 8046 is coupled to the two light sources 8042, 8044, the first image capture unit 8022, and the second image capture unit 8024 for controlling the light source 8042 to emit the infrared light with intensity I1 at a second time sequence (e.g. times T2, T5, T8, T11, . . . ), and controlling the first image capture unit 8022 and the second image capture unit 8024 to capture a second series of left eye images (e.g. left eye images L2, L5, L8, L11, . . . ) and a second series of right eye images (e.g. right eye images R2, R5, R8, R11, . . . ) corresponding to the light source 8042, respectively. The control unit 8046 is further used for controlling the light source 8044 to emit the infrared light with intensity I2 at a third time sequence (e.g. times T3, T6, T9, T12, . . . ), and controlling the first image capture unit 8022 and the second image capture unit 8024 to capture a third series of left eye images (e.g. left eye images L3, L6, L9, L12, . . . ) and a third series of right eye images (e.g. right eye images R3, R6, R9, R12, . . . ) corresponding to the light source 8044, respectively, wherein the first time sequence, the second time sequence, and the third time sequence are different and interlaced each other.

As shown in FIG. 8, the image calibration unit 806 is coupled to the image capture module 802 for executing a camera calibration process on the first image capture unit 8022 and the second image capture unit 8024 according to camera calibration parameters, respectively, wherein the camera calibration parameters can be generated by the well-known prior art. Therefore, through the camera calibration process on the first image capture unit 8022 and the second image capture unit 8024, the image calibration unit 806 can calibrate geometric position errors between each left eye image of the first series of left eye images (the left eye images L1, L4, L7, L10, . . . ) and a corresponding right eye image of the first series of right eye images (the right eye images R1, R4, R7, R10, . . . ) to let the each left eye image of the first series of left eye images and the corresponding right eye image of the first series of right eye images be aligned. For example, the image calibration unit 806 can calibrate the left eye image L1 and the corresponding right eye image R1 to let objects in the left eye image L1 be found in horizontal positions (disparities) of the corresponding right eye image R1. In addition, through the camera calibration process on the first image capture unit 8022 and the second image capture unit 8024, the image calibration unit 806 is further used for calibrating geometric position errors between each left eye image of the second series of left eye images (the left eye images L2, L5, L8, L11, . . . ) and a corresponding right eye image of the second series of right eye images (the right eye images R2, R5, R8, R11, . . . ), and calibrating geometric position errors between each left eye image of the third series of left eye images (the left eye images L3, L6, L9, L12, . . . ) and a corresponding right eye image of the third series of right eye images (the right eye images R3, R6, R9, R12, . . . ). In addition, the image calibration unit 806 is further used for calibrating geometric errors between the first image capture unit 8022 and the second image capture unit 8024 (e.g. lens errors and assembly errors between the first image capture unit 8022 and the second image capture unit 8024).

As shown in FIG. 8, the corresponding unit 808 is coupled to the image calibration unit 806 for finding each corresponding object simultaneously shown in the each left eye image of the first series of left eye images (the left eye images L1, L4, L7, L10, . . . ) and the corresponding right eye image of the first series of right eye images (the right eye images R1, R4, R7, R10, . . . ). For example, the corresponding unit 808 can find each corresponding object (e.g. the objects O1, O2, O3, O4 shown in FIG. 2) simultaneously shown in the left eye image L1 and the corresponding right eye image R1. In addition, the corresponding unit 808 is further used for finding a first predetermined area between the each left eye image of the second series of left eye images (the left eye images L2, L5, L8, L11, . . . ) and the corresponding right eye image of the second series of right eye images (the right eye images R2, R5, R8, R11, . . . ) corresponding to the light source 8042. Because the second series of left eye images (the left eye images L2, L5, L8, L11, . . . ) and the second series of right eye images (the right eye images R2, R5, R8, R11, . . . ) correspond to the light source 8042, and the infrared light with intensity I1 emitted by the light source 8042 can reach the position LO1 (as shown in FIG. 3), the first predetermined area between the each left eye image of the second series of left eye images (the left eye images L2, L5, L8, L11, . . . ) and the corresponding right eye image of the second series of right eye images (the right eye images R2, R5, R8, R11, . . . ) corresponding to the light source 8042 corresponds to the position LO1 (as shown in FIG. 3). In addition, the corresponding unit 808 is further used for finding a second predetermined area between the each left eye image of the third series of left eye images (the left eye images L3, L6, L9, L12, . . . ) and the corresponding right eye image of the third series of right eye images (R3, R6, R9, R12, . . . ) corresponding to the light source 8044. Because the third series of left eye images (the left eye images L3, L6, L9, L12, . . . ) and the third series of right eye images (the right eye images R3, R6, R9, R12, . . . ) correspond to the light source 8044, and the infrared light with intensity I2 emitted by the light source 8044 can reach the position LO2 (as shown in FIG. 4), the second predetermined area between the each left eye image of the third series of left eye images (the left eye images L3, L6, L9, L12, . . . ) and the corresponding right eye image of the third series of right eye images (the right eye images R3, R6, R9, R12, . . . ) corresponding to the light source 8044 corresponds to the position LO2 (as shown in FIG. 4).

As shown in FIG. 8, the processing unit 810 is coupled to the corresponding unit 808. After the corresponding unit 808 finds each corresponding object (e.g. the objects O1, O2, O3, O4 shown in FIG. 2) simultaneously shown in the left eye image L1 and the corresponding right eye image R1, the first predetermined area (e.g. the position LO1 shown in FIG. 3) between the left eye image L2 and the corresponding right eye image R2 corresponding to the light source 8042, and the second predetermined area (e.g. the position LO2 shown in FIG. 4) between the left eye image L3 and the corresponding right eye image R3 corresponding to the light source 8044, the processing unit 810 generates 2 depth informations (e.g. the depth informations DIFF1, DIFF2 shown in FIG. 6) corresponding to the two light sources 8042, 8044 according to the first predetermined area and the second predetermined area corresponding to the two light sources 8042, 8044, respectively, and each corresponding object simultaneously shown in the left eye image L1 and the corresponding right eye image R1, wherein subsequent operational principles of the processing unit 810 generating the 2 depth informations corresponding to the two light sources 8042, 8044 are the same as those of the processing unit 112 generating the 3 depth informations DI1, DI2, DI3 corresponding to the three light sources 102, 104, 106, so further description thereof is omitted for simplicity.

As shown in FIG. 8, the triangulation unit 812 is coupled to processing unit 810 for generating a depth map DM corresponding to each corresponding object simultaneously shown in the left eye image L1 and the corresponding right eye image R1 according to a triangle law, the 2 depth informations corresponding to the two light sources 8042, 8044, and each corresponding object simultaneously shown in the left eye image L1 and the corresponding right eye image R1. That is to say, the stereo camera 800 can utilize the 2 depth informations corresponding to the two light sources 8042, 8044 to assist the triangulation unit 812 to generate the depth map DM corresponding to the each corresponding object simultaneously shown in the left eye image L1 and the corresponding right eye image R1. After the triangulation unit 812 generates depth map DM corresponding to the each corresponding object simultaneously shown in the left eye image L1 and the corresponding right eye image R1, the stereo camera 800 can generate a three-dimensional image corresponding to the each corresponding object simultaneously shown in the left eye image L1 and the corresponding right eye image R1 according to the depth map DM. In addition, because the depth map DM corresponds to the left eye images L1, L2, L3 and the right images R1, R2, R3, depth maps corresponding to other left eye images and other right eye images can also be generated according to the above mentioned principles, so further description thereof is omitted for simplicity.

In addition, in another embodiment of the present invention, each light source of the two light sources 8042, 8044 can emit lights with corresponding intensity and corresponding wavelength, wherein subsequent generation principles of an embodiment of each light source of the two light sources

8042, 8044 emitting a light with corresponding intensity and corresponding wavelength are the same as those of the above mentioned embodiment of each light source of the two light sources 8042, 8044 emitting the corresponding intensity light, so further description thereof is omitted for simplicity.

To sum up, the device for generating depth information and the method for generating depth information utilize the control unit to control each light source of a plurality of light sources to emit a corresponding intensity light at a time corresponding to the each light source of the plurality of light sources, utilize the control unit to control the image capture unit to capture an image corresponding to the each light source of the plurality of light sources, and utilize the processing unit to generate a plurality of depth informations corresponding to the plurality of light sources according to a plurality of images corresponding to the plurality of light sources and a background image after the image capture unit captures the plurality of images corresponding to the plurality of light sources and the background image. In addition, the stereo camera utilizes the method for generating depth information to assist the triangulation unit of the stereo camera to generate a depth map corresponding to each corresponding object simultaneously shown in a left eye image and a corresponding right eye image. Thus, because a depth map corresponding to each corresponding object simultaneously shown in a left eye image and a right eye image provided by the prior art is more segmented, the depth map corresponding to the each corresponding object simultaneously shown in the left eye image and the corresponding right eye image provided by the present invention is more accurate and can suppress noise. Therefore, a three-dimensional image generated according to the depth map corresponding to the each corresponding object simultaneously shown in the left eye image and the corresponding right eye image provided by the present invention is less distorted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for generating depth information, comprising:
   a plurality of light sources, wherein each light source of the plurality of light sources emits a corresponding intensity light, and intensities of corresponding intensity lights emitted by the plurality of light sources are different from each other;
   an image capture unit;
   a control unit coupled to the plurality of light sources and the image capture unit for controlling the each light source of the plurality of light sources to emit the corresponding intensity light in turn, and controlling the image capture unit to capture a plurality of images corresponding to the plurality of light sources and controlling the image capture unit to capture a background image corresponding to all the plurality of light sources being turned off; and
   a processing unit coupled to the image capture unit for performing a first subtraction operation of a plurality of subtraction operations to generate a plurality of difference images according to each image of the plurality of images corresponding to the plurality of light sources and the background image, and performing a second subtraction operation of the plurality of subtraction operations to generate a depth information of a plurality of depth information corresponding to the each light source according to two adjacent difference images of the plurality of difference images corresponding to the each light source.

2. The device of claim 1, wherein the plurality of light sources are infrared light sources.

3. The device of claim 1, wherein the each light source of the plurality of light sources has a corresponding wavelength.

4. A method for generating depth information, wherein a device for generating depth information comprises a plurality of light sources, an image capture unit, a control unit, and a processing unit, the method comprising:
   the control unit controlling each light source of the plurality of light sources to emit a corresponding intensity light in turn, wherein intensities of corresponding intensity lights emitted by the plurality of light sources are different from each other;
   the control unit controlling the image capture unit to capture a plurality of images corresponding to the plurality of light sources and controlling the image capture unit to capture a background image corresponding to all the plurality of light sources being turned off; and
   after the image capture unit captures the plurality of images and the background image, the processing unit performing a first subtraction operation of a plurality of subtraction operations to generate a plurality of difference images according to each image of the plurality of images corresponding to the plurality of light sources and the background image, and performing a second subtraction operation of the plurality of subtraction operations to generate a depth information of a plurality of depth information corresponding to the each light source according to two adjacent difference images of the plurality of difference images corresponding to the each light source.

5. The method of claim 4, wherein the plurality of light sources are infrared light sources.

6. The method of claim 4, wherein the each light source of the plurality of light sources has a corresponding wavelength.

* * * * *